United States Patent

[11] 3,560,742

| [72] | Inventors | Jacques J. Weinstock<br>Flushing;<br>William D. Hay, Peekskill, N.Y. |
|---|---|---|
| [21] | Appl. No. | 609,941 |
| [22] | Filed | Jan. 17, 1967 |
| [45] | Patented | Feb. 2, 1971 |
| [73] | Assignee | Unit Process Assemblies, Inc.<br>Woodside, N.Y.<br>a corporation of New York |

[54] PORTABLE BETA BACKSCATTER MEASURING INSTRUMENT ASSEMBLY
7 Claims, 4 Drawing Figs.

[52] U.S. Cl. .................................................. 250/83,
                                                                250/83.3
[51] Int. Cl. ..................................................... G01t 1/16
[50] Field of Search ........................................ 250/83.3,
                                                                 83.3D, 83

[56] References Cited
UNITED STATES PATENTS

| 3,132,248 | 5/1964 | Eggebraaten et al. | 250/83.3 |
| 3,108,188 | 10/1963 | Dewan et al. | 250/83.3 |
| 2,675,482 | 4/1954 | Brunton | 250/83.3 |
| 2,528,724 | 11/1950 | Herzog | 250/83.3 |

*Primary Examiner*—Ralph G. Nilson
*Assistant Examiner*—D. L. Willis
*Attorneys*—W. D. Keith, Albert C. Johnston, Robert E. Isner and George F. Desmarais ABSTRACT: A portable beta backscatter measuring instrument assembly to effect measurements of the thickness of coatings on workpieces, including a jig mounted portable probe member incorporating means adjustable relative thereto to engage a workpiece, or an abutment fixed relative to a workpiece, to hold the probe member in firm engagement with a surface of the workpiece in proper position for measuring the thickness of a coating on the surface.

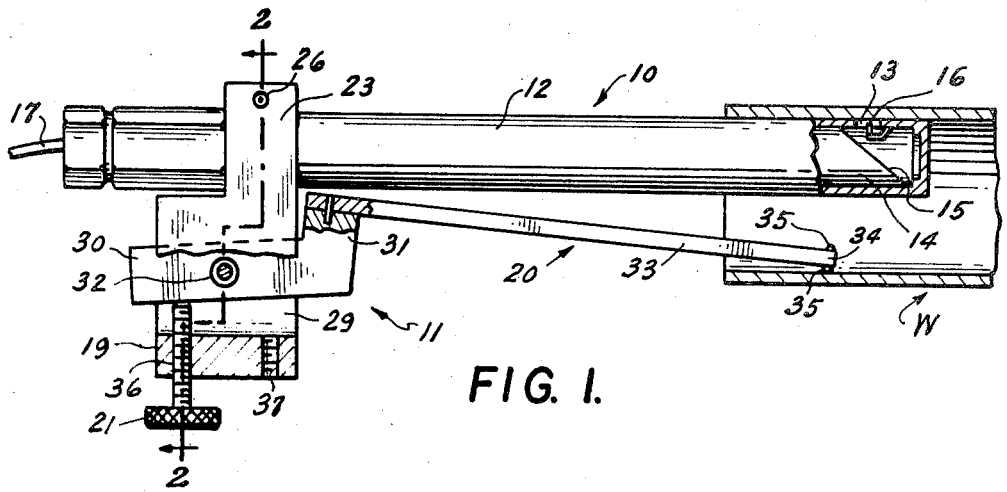
FIG. 1.
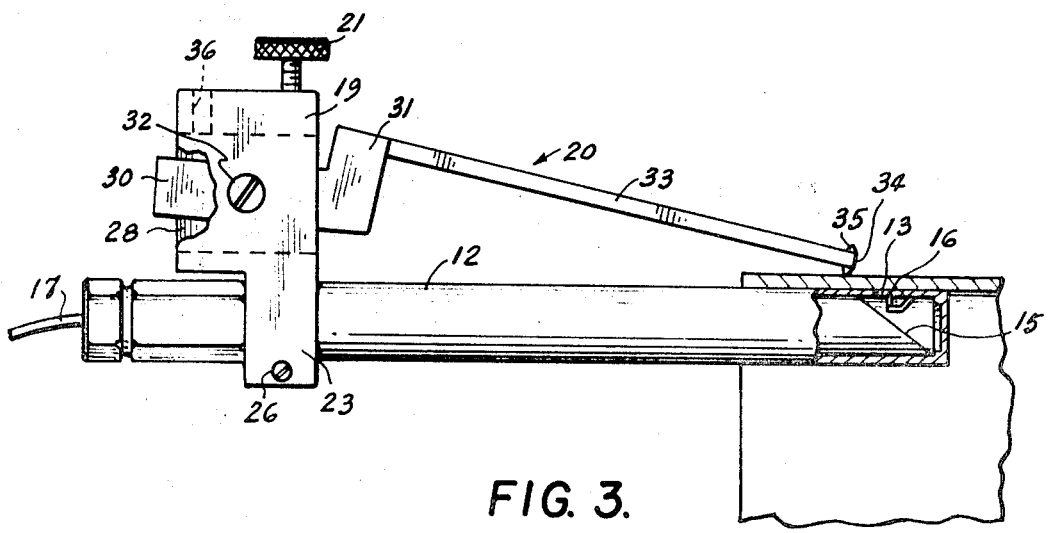
FIG. 3.
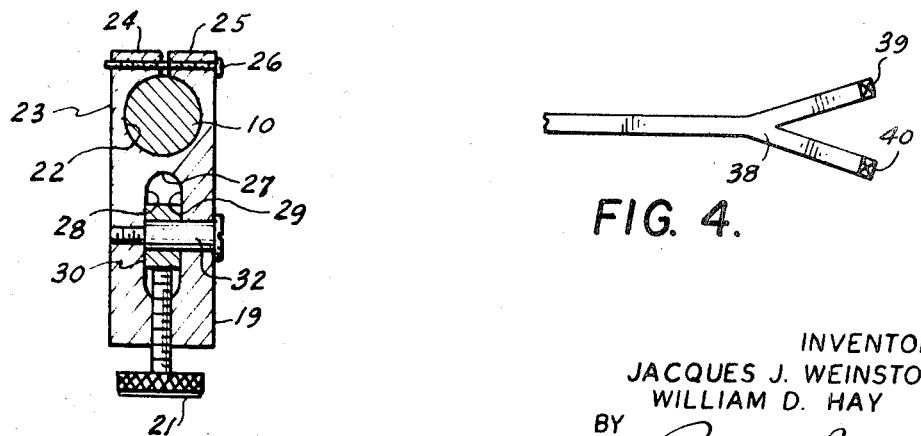
FIG. 2.
FIG. 4.
INVENTORS
JACQUES J. WEINSTOCK
WILLIAM D. HAY
BY
ATTORNEY

PORTABLE BETA BACKSCATTER MEASURING INSTRUMENT ASSEMBLY

This invention relates to instruments for measuring the thickness of coatings by beta ray backscatter techniques and more particularly to a portable beta backscatter type instrument including a probe unit and auxiliary means for positioning the probe unit on a workpiece in proper position for making thickness measurements.

Beta ray backscatter type instruments have been extensively used to measure the thickness of metallic deposits and of coatings of various other materials. These instruments generally include a source of beta radiation, conveniently a radioactive isotope, means for directing the emitted radiation on to a workpiece, a radiation detector, conveniently a Geiger-Muller tube, positioned to receive radiation backscattered from the workpiece, and an associated electronic counter or readout unit which converts the output of the detector into utilizable intelligence. The accuracy and sensitivity of a beta ray backscatter type measuring system is largely dependent upon the geometry of the system, that is, the geometric or positional relationship between the source, workpiece and detector and, to this end, auxiliary means for locating the workpiece relative to the source and detector are usually incorporated, in accordance with the dictates of the workpiece configuration, as a component of most such measuring systems.

Although beta backscatter type instruments are experiencing continually wider use for the measurement of coatings on readily accessible surfaces, the aforementioned "geometry" requirements have led to difficulties in adapting their utilization to the measurement of coatings on a variety of workpieces of different configurations. A particular problem has been the measuring of the thickness of coatings on relatively large arcuate surfaces, such as tube walls and the like, in a rapid and simple manner.

In accordance with the present invention, a portable beta backscatter probe unit is provided with a mounting jig incorporating a positioning arm selectively locatable laterally thereto in compressive relation with an adjacent base surface to locate the probe unit in operative engagement with the surface of the workpiece at which a measurement is to be taken. More specifically the positioning arm which is selectively mountable in two discrete operational relationships with said probe unit and the probe unit are arranged to complementally exert oppositely acting forces on a base surface and on the workpiece surface and thus firmly locate the operative components of the probe in selected position for effecting the desired measurement.

The primary object of the invention is to provide a portable beta ray backscatter measuring instrument selectively adapted for manipulative disposition in measuring relation with a workpiece surface of arcuate character such as a tube wall or the like.

Another object of the invention is to provide a positioning jig for a portable beta backscatter probe unit selectively mountable in first and second operative relation therewith to effect operative disposition of said probe unit against selected workpiece surfaces.

Still another object of the invention is the provision of a portable beta backscatter measuring instrument assembly capable of adjustably accommodating adaptation thereof to a wide range of workpiece sizes and configurations.

A further object of the invention is to provide a portable beta backscatter measuring instrument assembly comprising a probe unit and a positioning arm selectively associatable therewith in one or two operative positions and means for effecting displacement of said arm relative to said probe unit in both said operative positions to accommodate a predetermined range of workpiece configurations.

The above and other objects, features and advantages of this invention will be apparent in the following detailed description of an illustrative presently preferred embodiment thereof which is to be read in connection with the accompanying drawings, wherein:

FIG. 1 is a side view, partly in section, of a preferred embodiment of the invention having the positioning arm disposed in first operative position for measurement of thickness of a coating at the inside surface of a tubular member;

FIG. 2 is a cross sectional view on line 2–2 of FIG. 1;

FIG. 3 is a side view of the assembly shown in FIG. 1 with the positioning arm disposed in second operative position to enable its use for measuring a coating at the inside surface of a relatively larger tubular member, or a coating at either side of a sheet, bar or other platelike workpiece; and FIG. 4 shows an alternate construction for the operative end of a positioning arm.

Referring to the drawings, the illustrated embodiment broadly includes a conventional portable beta backscatter probe unit 10 and an auxiliary jig assembly 11 mounted thereon, together constituting a portable beta backscatter instrument assembly of the character hereinabove referred to.

As illustrated, the probe unit includes an elongated cylindrical casing 12 having an exposure opening or window 13 therein located in the sidewall near the terminal end thereof. Contained within the casing is a beta ray detector 14 having its window 15 disposed opposite the exposure opening 13, and a beta ray emitting source 16, such as a radioactive isotope contained in a cup, mounted intermediate the window 15 and the exposure opening 13.

As is conventional the beta ray emitting source 16 is fixed in a predetermined position to selectively direct beta radiation through the exposure opening 13 to impinge on a workpiece surface disposed in covering relation therewith, and the output of the detector 14 is transmitted through a cable 17 to a remotely located readout or reader unit (not shown) for conversion to utilizable intelligence.

The auxiliary jig assembly includes a base member or block 19 having a body portion adapted to pivotally support a positioning arm 20 in either of the operating positions and a bifurcated projecting portion 23 shaped to provide a probe unit accommodating bore 22. Disposed within the bore 22, and clamped in selectively locatable in both rotative and longitudinal fixed relation therein by a tightening of the screw 26 traversing the arms 24 and 25, is the probe unit 10.

The body portion of the block 19 is provided with a longitudinal slot 27 having opposite sidewalls 28 and 29 disposed in uniform spaced relation and parallel to the axis of the bore 22. The slot sidewalls 28 and 29 are spaced apart a sufficient distance to guidingly accommodate a base cranklike element 30 for the positioning arm 20 pivotally mounted therewith on a transversely disposed pivot pin 32. Mounted on the end of the crank element 30 and extending generally lengthwise of the probe unit 10 is an elongate arm member 33. As shown the arm member 33 is of an appropriate length to enable its operative end 34 to be brought to bear on an adjacent surface, such as the interior surface of a tubular workpiece W, as illustrated in FIG. 1. The arm suitably comprises a bar having a rectangular or circular cross section with the maximum transverse dimension thereof measuring less than the width of the basal crank portion 30 and provided with slight enlargements 35 on the operative end thereof to serve as pressure concentration elements or as fastening aids to a rubber or other elastically deformable cap element.

The body portion of the base block 19 is provided with a pair of tapped bores 36 and 37 disposed transverse to the pivot pin 32 and intersecting the longitudinal slot 27 on either side of the pivot pin. The bores 36 and 37 are adapted to operatively contain a thumbscrew 21 manipulatable by a user to apply force to the crank element 30 at either side of the fulcrum thereof to effect selective displacement of the positioning arm 20 relative to the probe unit 10.

As shown in the drawing the basal crank element 30 and its offset portion 31 permits mounting of the positioning arm 20 in either of two selective operating positions relative to the base block 19 to afford, in combination with the selective location of the probe unit 10 within the bore 22, a marked degree of flexibility in adapting the instrument for use in association with workpieces of differing configurations simply by inversion of the arm 20 on its pivot 32.

By way of example and as shown in FIG. 1, the positioning arm 20 is mounted in a first operating position relative to the block 19 and probe unit 10 wherein application of force to the crank element 30 by thumbscrew 21 as disposed in the tapped bore 36 serves to force the operative ends of the probe unit 10 and the arm 33 laterally apart and into compressive engagement with diametrically spaced areas as would be constituted by the inside surfaces of a tubular workpiece or pipe.

In order to convert the arm 20 into its second operating position for mounting of the instrument assembly onto a sheet or platelike workpiece, the pivot pin is removed, the crank element 30 is inverted and remounted on the pivot pin 32 as illustrated in FIG. 3. Coincidentally therewith the adjusting thumbscrew 21 is shifted from the tapped bore 36 to the tapped bore 37 so that inward displacement thereof operates to urge the arm 33 toward the probe unit and thus permit the reassembled probe and jig assembly to function in the manner of a pair of pincers gripping an article disposed therebetween. As will be apparent, such crank element inversion also requires rotation of the probe unit 10 in the bore through an angle of 180°.

While the arm member 33 of the positioning arm 20 is shown in FIGS. 1 and 3 as a straight bar, it is apparent that it may be provided in other appropriate forms. The operative end of the arm member 33, for example, may be forked, as shown at 38 in FIG. 4, to provide two bearing points 39 and 40 of a three-point supporting system for the probe unit 10 and the mounting jig 11 of which the third bearing point is provided by the probe unit.

As will be apparent from the foregoing the described portable beta backscatter measuring instrument assembly is possessed of multiple degrees of adjustment both as to the relationship of the probe unit to the mounting jig and as to the operating elements of the mounting jig relative to the probe and as such affords a user a multiplicity of selectable arrangements to accommodate its adaptation to workpieces of diverse size and shape.

While the principle of the invention and a preferred way of putting it into practice have been described hereinbefore, it will be evident to those skilled in the art that various alterations and substitutions may be made without departing from the substance of the invention, which is intended to be defined in the following claims.

We claim:

1. A portable beta backscatter measuring instrument assembly for measuring the thicknesses of coatings on workpieces, comprising:
   a beta backscatter probe unit having a casing containing a beta ray emitting source and means for detecting radiation backscattered through an opening in said casing from a workpiece surface disposed in overlying relation therewith;
   a jig assembly for holding said probe unit in operative compressive engagement with a workpiece surface and with said opening disposed in abutting relation therewith;
   said jig assembly including a base member securable in selected operative relation onto said probe unit casing;
   a crank member pivotally mountable in first and second operative positions within said base member and having an elongate arm member extending therefrom; and
   means selectively locatable in accord with the selected operative position of said crank element for applying unidirectional leverage force thereto to displace said elongate arm member relative to said probe unit and into engagement with a support surface disposed apart from the workpiece surface.

2. An instrument assembly according to claim 1, wherein said jig assembly base member is adapted to be affixed to said probe unit at any selected location along the effective length of the casing thereof and in any selected angular position relative to the situs of beta ray emission.

3. An instrument assembly according to claim 1, wherein said jig assembly base member includes means for clamping the same onto said casing.

4. An instrument assembly according to claim 1, wherein said arm member is a substantially straight bar.

5. An instrument assembly according to claim 1, wherein said arm member has a fork adjacent its operative end to provide two bearing points of a three-point bearing system.

6. A portable beta backscatter measuring instrument assembly for measuring the thicknesses of coatings on workpieces, comprising:
   a beta backscatter probe unit having a casing containing a beta ray emitting source and means for detecting radiation backscattered through an opening in said casing from a workpiece surface disposed in overlying relation therewith;
   a jig assembly for holding said probe unit in operative compressive engagement with workpiece surface;
   said jig assembly including a base member securable in selected operative relation onto said probe unit casing;
   said base member including an oversized longitudinal bore having a removable pivot pin transversely disposed thereacross;
   a crank member pivotally mountable on said pivot pin within said longitudinal bore in first and second operative positions therewithin and having an elongate arm member extending therefrom; and
   means selectively locatable in accord with the selected operative position of said crank element for applying unidirectional leverage force thereto to displace said elongate arm member relative to said probe unit and into engagement with a support surface disposed apart from the workpiece surface.

7. An instrument assembly according to claim 6, including a pair of tapped bores in said base member communicating with said longitudinal bore and wherein said selectively locatable means comprises a thumbscrew selectively locatable in either of said tapped bores.